United States Patent
Miki

(10) Patent No.: US 11,121,371 B2
(45) Date of Patent: *Sep. 14, 2021

(54) CATHODE ACTIVE MATERIAL AND FLUORIDE ION BATTERY

(71) Applicant: TOYOTA JIDOSHA KABUSHIKI KAISHA, Toyota (JP)

(72) Inventor: Hidenori Miki, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

This patent is subject to a terminal disclaimer.

(21) Appl. No.: 16/402,524

(22) Filed: May 3, 2019

(65) Prior Publication Data

US 2019/0348677 A1 Nov. 14, 2019

(30) Foreign Application Priority Data

May 14, 2018 (JP) .............................. JP2018-092979

(51) Int. Cl.
| | |
|---|---|
| *H01M 4/00* | (2006.01) |
| *H01M 4/58* | (2010.01) |
| *H01M 10/05* | (2010.01) |
| *C01G 3/04* | (2006.01) |
| *H01M 4/36* | (2006.01) |
| *H01M 4/02* | (2006.01) |

(52) U.S. Cl.
CPC .............. *H01M 4/582* (2013.01); *C01G 3/04* (2013.01); *H01M 4/364* (2013.01); *H01M 10/05* (2013.01); *H01M 2004/028* (2013.01)

(58) Field of Classification Search
None
See application file for complete search history.

(56) References Cited

U.S. PATENT DOCUMENTS

| | | |
|---|---|---|
| 4,399,204 A | 8/1983 | Clark |
| 5,320,917 A | 6/1994 | Takada et al. |
| 9,484,594 B2 * | 11/2016 | Amatucci ......... H01M 10/0561 |
| 2008/0102373 A1 | 5/2008 | Potanin |
| 2016/0043439 A1 | 2/2016 | Nakamoto et al. |
| 2018/0351176 A1 | 12/2018 | Miki |

FOREIGN PATENT DOCUMENTS

| | | |
|---|---|---|
| JP | 04238815 A | 8/1992 |
| JP | 2008-537312 A | 9/2008 |

OTHER PUBLICATIONS

Buchinskaya and Fedorov, Lead difluoride and related systems, 2004 Russian Academy of Sciences and Turpion Ltd. Russian Chemical Reviews 73 (4) 371-400 (Year: 2004).*

(Continued)

*Primary Examiner* — Milton I Cano
*Assistant Examiner* — Mary G Henshaw
(74) *Attorney, Agent, or Firm* — Sughrue Mion, PLLC

(57) ABSTRACT

A main object of the present disclosure is to provide a cathode active material used for a fluoride ion battery, the cathode active material comprising: a first active material having a composition represented by $Pb_{2-x}Cu_{1+x}F_6$, wherein $0 \leq x < 2$; and a second active material containing a Bi element and a F element.

6 Claims, 5 Drawing Sheets

(56) References Cited

OTHER PUBLICATIONS

Jean-Michel Dance, "Le Fluorure Ferromagnetique $Pb_2CuF_6$", Mat. Res. Bull., vol. 20, pp. 431-435, 1985, ( 5 pages total).
John H. Kennedy et al., "Thin-Film Galvanic Cell $Pb/PbF_2/PbF_2$, CuF2/Cu", J. Electrochemical Science and Technology, vol. 123, No. 1, Jan. 1976, pp. 10-14 ( 5 pages total).
Maurice Samouël et al., "Powder diffraction data for copper hexafluorides: $Ba_2CuF_6$ and $Pb_2CuF_6$", Powder Diffraction, vol. 10, No. 3, Sep. 1995, p. 221-222 ( 2 pages total).
M. Anji Reddy et al., "Batteries based on fluoride shuttle", Journal of Materials Chemistry, 2011, vol. 21, pp. 17059-17062, ( 5 pages total).
Communication dated Mar. 6, 2020, from the United States Patent and Trademark office in U.S. Appl. No. 15/979,964.
Notice of Allowance dated Sep. 4, 2020, from the United States Patent and Trademark Office in U.S. Appl. No. 15/979,964.

\* cited by examiner ly, Cu has been known as a

CATHODE ACTIVE MATERIAL AND FLUORIDE ION BATTERY

TECHNICAL FIELD

The present disclosure relates to a cathode active material with excellent capacity maintenance rate.

BACKGROUND ART

As high-voltage and high-energy density batteries, for example, Li ion batteries are known. The Li ion battery is a cation-based battery utilizing Li ions as the carrier. Meanwhile, as anion-based batteries, fluoride ion batteries utilizing fluoride ions as the carrier are known. For example, Patent Literature 1 discloses a lot of fluoride salt (such as CuF, $CuF_2$, $PbF_2$, $PbF_4$) as a cathode in charged state for a fluoride ion battery.

CITATION LIST

Patent Literatures

Patent Literature 1: Japanese Patent Application Publication (JP-A) No. 2008-537312

SUMMARY OF DISCLOSURE

Technical Problem

The present inventor has found out a novel cathode active material containing a Pb element, a Cu element, and a F element as a cathode active material usable in a fluoride ion battery from the researches until now. This cathode active material is an active material of which phase split into, during first discharge for example, $PbF_2$ that functions as a solid electrolyte (ion conductor) and Cu that functions as an active material. Although this cathode active material is usable in a fluoride ion battery, the capacity maintenance rate thereof tends to be low. The present disclosure has been made in view of the above circumstances, and a main object thereof is to provide a cathode active material with excellent capacity maintenance rate.

Solution to Problem

In order to achieve the object, the present disclosure provides a cathode active material used for a fluoride ion battery, the cathode active material comprising: a first active material having a composition represented by $Pb_{2-x}Cu_{1+x}F_6$, wherein $0 \leq x < 2$; and a second active material containing a Bi element and a F element.

According to the present disclosure, usage of the second active material in addition to the first active material having the specific composition allows the cathode active material to have excellent capacity maintenance rate.

The present disclosure also provides a cathode active material used for a fluoride ion battery, the cathode active material comprising: a first active material that contains a Pb element, a Cu element, and a F element, and has a peak at a position of $2\theta = 22.6°\pm0.5°$, $27.8°\pm0.5°$, $38.5°\pm0.5°$, and $44.8°\pm0.5°$ in X-ray diffraction measurement using a CuKα ray; and a second active material containing a Bi element and a F element.

According to the present disclosure, usage of the second active material in addition to the first active material having the specific crystal phase allows the cathode active material to have excellent capacity maintenance rate.

In the disclosure, the first active material and the second active material may be dissolved.

In the disclosure, a proportion of the second active material to a total of the first active material and the second active material may be 30 mol % or less.

The present disclosure also provides a fluoride ion battery comprising a cathode active material layer, an anode active material layer, and an electrolyte layer formed between the cathode active material layer and the anode active material layer, wherein the cathode active material layer contains the above described cathode active material.

According to the present disclosure, usage of the above described cathode active material allows a fluoride ion battery to have excellent capacity maintenance rate.

Advantageous Effects of Disclosure

The present disclosure exhibits effects that a cathode active material with excellent capacity maintenance rate can be provided.

DESCRIPTION OF EMBODIMENTS

The cathode active material and the fluoride ion battery of the present disclosure are hereinafter explained in details.

A. Cathode Active Material

The cathode active material of the present disclosure is a cathode active material used in a fluoride ion battery. The cathode active material of the present disclosure comprises a first active material containing at least a Pb element, a Cu element, and a F element; and a second active material containing a Bi element and a F element.

According to the present disclosure, usage of the second active material in addition to the first active material allows a cathode active material to have excellent capacity maintenance rate. Conventionally, Cu has been known as a cathode active material for a fluoride ion battery; Cu is a practical material for its theoretical capacity and potential. Meanwhile, it is difficult to make Cu function as an active material without using fine particles since the dispersion coefficient of fluoride ions is low. In specific, it is necessary that the fluoride ions are dispersed in Cu during charge; however, due to its low dispersion coefficient, a reaction would not proceed to the inside of Cu if a particle with large particle size is used, and the charge would stop at just the fluorination reaction of the surface of Cu; thus, the theoretical capacity would not be obtained.

In the interim, the first active material (such as $Pb_2CuF_6$) is an active material of which phase split into, during first discharge, $PbF_2$ that functions as a solid electrolyte (ion conductor) and Cu that functions as an active material; the dispersion coefficient of fluoride ions is high since $PbF_2$ is present inside the active material. As the result, there is an advantage that the function as an active material is allowed even if it is not a fine particle. Also, there is an advantage that the first active material can be charged at a potential in the same level as to Cu.

Figure 1:
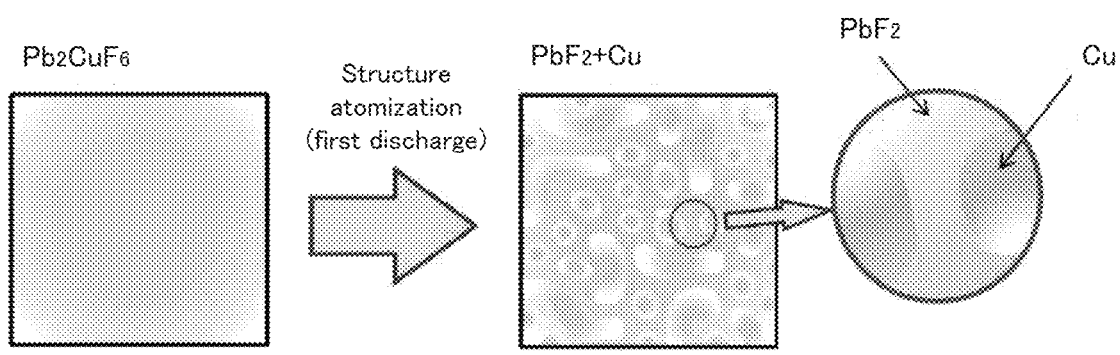
FIG. 1 is a schematic diagram explaining the split-phases of $Pb_2CuF_6$.

FIG. 1 is a schematic diagram explaining the split-phases of $Pb_2CuF_6$. As shown in FIG. 1, the crystal structure of $Pb_2CuF_6$ is uniform. Later, $Pb_2CuF_6$ will be split into $PbF_2$ and Cu by discharge and the structure will be atomized. This phenomenon presumably corresponds to spinodal decomposition (phase-split responding to the change of state where unstable state is changed to equilibrium state). Split $PbF_2$ and Cu are dispersed in atomic level and excellent interface is formed between $PbF_2$ and Cu. The dispersion coefficient of fluoride ions is high since $PbF_2$ is present inside the active material. As the result, the function as an active material is allowed even if it is not a fine particle.

Meanwhile, although the first active material (such as $Pb_2CuF_6$) can be used in a fluoride ion battery, the capacity maintenance rate tends to be low. The reason therefor is presumed that the fine particles of Cu generated during discharge aggregate to coarsen. When the fine particles of Cu are coarsen, a phenomenon similar to that of the above described conventional Cu occurs to degrade the function as an active material. As the result, the capacity maintenance rate is presumably degraded. Also, the fine particles of Cu are coarsen more remarkably as the proportion of Cu included in the first active material increases. To solve the problem, in the present disclosure, the second active material containing a Bi element is used in addition to the first active material. Cu and Bi are not dissolved in a metal state. In other words, the both are not alloyed in a metal state and thus, the presence of Bi inhibits the fine particles of Cu from being coarsen, which results in presumably inhibiting the degrade of the capacity maintenance rate.

1. First Active Material

The first active material contains at least a Pb element, a Cu element, and a F element. It is preferable that the first active material has a composition represented by $Pb_{2-x}Cu_{1+x}F_6$, wherein $0 \le x < 2$. The "x" may be 0, and may be larger than 0. In the latter case, the "x" may satisfy $0.1 \le x$, may satisfy $0.2 \le x$, may satisfy $0.5 \le x$, may satisfy $1.0 \le x$, and may satisfy $1.2 \le x$. Meanwhile, the "x" is usually smaller than 2. The "x" may satisfy $x \le 1.75$, and may satisfy $x \le 1.5$.

Also, the first active material preferably has a peak at a position of at least one of $2\theta = 22.6°\pm0.5°$, $27.8°\pm0.5°$, $30.8°\pm0.5°$, $31.6°\pm0.5°$, $38.5°\pm0.5°$, $39.1°\pm0.5°$, and $44.8°\pm0.5°$ in an X-ray diffraction measurement using a CuKα ray. Incidentally, the range of these peak positions may be $\pm0.3°$, and may be $\pm0.10$. Also, the crystal phase having the peak above may be referred to as $Pb_2CuF_6$ crystal phase in some cases.

Also, when the diffraction intensity of the peak at $2\theta=22.6°\pm0.5°$ is regarded as $I_1$ and the diffraction intensity of the peak at $2\theta=27.8°\pm0.5°$ is regarded as $I_2$, the proportion of $I_1$ to $I_2$ ($I_1/I_2$) is, for example, 0.1 or more, and may be 0.2 or more. Meanwhile, $I_1/I_2$ is, for example, 0.5 or less.

The first active material preferably contains the $Pb_2CuF_6$ crystal phase as a main phase. The proportion of the $Pb_2CuF_6$ crystal phase to all the crystal phases included in the first active material is, for example, 50 weight % or more, may be 70 weight % or more, and may be 90 weight % or more.

There are no particular limitations on the shape of the first active material of the present disclosure, and examples thereof may include a granular shape. The average particle size ($D_{50}$) of the first active material is, for example, 0.1 μm or more and 50 μm or less, and preferably 1 μm or more and 20 μm or less. The average particle size ($D_{50}$) of the first active material may be measured by, for example, the result of a particle distribution measurement using a laser diffraction scattering method.

2. Second Active Material

The second active material contains at least a Bi element and a F element. The second active material may contain only the Bi element as a metal element, and may contain other element than the Bi element as a metal element. The second active material is preferably $BiF_3$. Also, the second active material preferably has a peak at a position of at least one of $2\theta=26.1°\pm0.5°$, $30.2°\pm0.50$, $43.3°\pm0.5°$, and $51.2°\pm0.5°$ in an X-ray diffraction measurement using a CuKα ray. Incidentally, the range of these peak positions may be $\pm0.3°$, and may be $\pm0.10$. Also, the crystal phase having the peak above may be referred to as $BiF_3$ crystal phase in some cases.

The second active material preferably contains the $BiF_3$ crystal phase as a main phase. The proportion of the $BiF_3$ crystal phase to all the crystal phases included in the second active material is, for example, 50 weight % or more, may be 70 weight % or more, and may be 90 weight % or more.

There are no particular limitations on the shape of the second active material of the present disclosure, and examples thereof may include a granular shape. The average particle size ($D_{50}$) of the second active material is, for example, 0.1 μm or more and 50 μm or less, and preferably 1 μm or more and 20 μm or less. The average particle size ($D_{50}$) of the second active material may be measured by, for example, the result of a particle distribution measurement using a laser diffraction scattering method.

There are no particular limitations on the proportion of the second active material to the total of the first active material and the second active material; it is usually larger than 0, may be 1 mol % or more, and may be 5 mol % or more. Meanwhile, the proportion of the second active material is, for example, 50 mol % or less, may be 40 mol % or less, and may be 30 mol % or less. When the proportion of the second active material is too much, the discharge capacity tends to be degraded.

3. Cathode Active Material

The cathode active material of the present disclosure contains the first active material and the second active material. The cathode active material of the present disclosure may contain the first active material and the second active material as a mixture, and may contain the first active material and the second active material as a solid solution. The mixture of the first active material and the second active material is usually separated into the two by a physical method. On the other hand, the solid solution of the first active material and the second active material cannot be usually separated into the two by a physical method.

In the present disclosure, it is preferable that the first active material and the second active material are dissolved. The reason therefor is because when Cu elements and Bi elements are dispersed to a high degree, aggregation of fine particles of Cu to be coarsen can be effectively inhibited. The cathode active material of the present disclosure preferably has a composition represented by $(100-y)Pb_{2-x}Cu_{1+x}F_6$-$yBiF_3$ ($0 \leq x < 2$, $0 < y \leq 50$). The preferable range for "x" is in the same contents as those described above. Meanwhile, "y" may satisfy $1 \leq y$, and may satisfy $5 \leq y$. Also, "y" may satisfy $y \leq 50$, may satisfy $y \leq 40$, and may satisfy $y \leq 30$.

In addition, the cathode active material of the present disclosure preferably comprises a Pb element, a Cu element, a Bi element, a F element, $Pb_2CuF_6$ crystal phase having peaks at the positions of $2\theta = 22.6° \pm 0.5°$, $27.8 \pm 0.5°$, $38.5° \pm 0.5°$, and $44.8° \pm 0.5°$, and $BiF_3$ crystal phase having peaks at the positions of $2\theta = 26.1° \pm 0.5°$ and $43.3° \pm 0.5°$ in an X-ray diffraction measurement using a CuKα ray.

There are no particular limitations on the shape of the cathode active material of the present disclosure, and examples thereof may include a granular shape. The average particle size ($D_{50}$) of the cathode active material is, for example, 0.1 μm or more and 50 μm or less, and preferably 1 μm or more and 20 μm or less. The average particle size ($D_{50}$) of the cathode active material may be measured by, for example, the result of a particle distribution measurement using a laser diffraction scattering method.

There are no particular limitations on the method for producing the cathode active material as long as the method allows the intended cathode active material to be obtained, and examples thereof may include a mechanical milling method.

B. Fluoride Ion Battery

Figure 2:
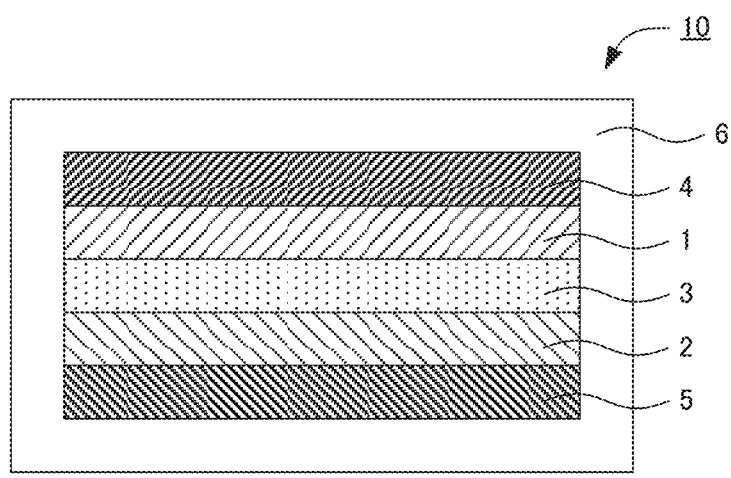
FIG. 2 is a schematic cross-sectional view illustrating the fluoride ion battery of the present disclosure.

FIG. 2 is a schematic cross-sectional view illustrating an example of the fluoride ion battery of the present disclosure. Fluoride ion battery 10 illustrated in FIG. 2 comprises cathode active material layer 1 containing a cathode active material, anode active material layer 2 containing an anode active material, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. The present disclosure features a configuration that cathode active material layer 1 comprises the cathode active material described in "A. Cathode active material" above.

According to the present disclosure, usage of the above described cathode active material allows a fluoride ion battery to have excellent capacity maintenance rate.

The fluoride ion battery of the present disclosure is hereinafter explained in each constitution.

1. Cathode Active Material Layer

The cathode active material layer in the present disclosure is a layer containing at least a cathode active material. The cathode active material is in the same contents as those described in "A. Cathode active material" above. The content of the cathode active material in the cathode active material layer is, for example, 25 weight % or more, preferably 50 weight % or more, and more preferably 75 weight % or more.

The cathode active material layer may further contain at least either one of a conductive material and a binder, other than the cathode active material. There are no particular limitations on the conductive material if it has the desired electron conductivity, and examples thereof may include a carbon material. Examples of the carbon material may include carbon black such as acetylene black, Ketjen black, furnace black, and thermal black; graphene, fullerene, and carbon nanotube. The content of the conductive material in the cathode active material layer is, for example, 10 weight % or less, and may be 5 weight % or less.

There are no particular limitations on the binder if it is chemically and electronically stable, and examples thereof may include a fluorine-based binder such as polyvinylidene fluoride (PVDF) and polytetra fluoroethylene (PTFE). The content of the binder in the cathode active material layer is, for example, 10 weight % or less, and may be 5 weight % or less.

The cathode active material layer may not contain a solid electrolyte. In that case, the cathode active material layer preferably contains the cathode active material and the conductive material. A fluoride ion battery comprising the cathode active material layer not containing the solid electrolyte is, for example, a fluoride ion battery before the first charge. In this case, the peak of $PbF_2$ which is a solid electrolyte is preferably not present when an XRD measurement is conducted for the cathode active material layer. Incidentally, the specification "not containing the solid electrolyte" includes the case when a trace of solid electrolyte is added for the purpose of, for example, avoiding the infringement of the patent right. For example, when the content of the solid electrolyte in the cathode active material layer is 5 weight % or less also satisfies the condition of "not containing the solid electrolyte".

Meanwhile, the cathode active material layer may contain just $PbF_2$ as the solid electrolyte. In that case, the cathode active material layer preferably contains the cathode active material, $PbF_2$, and a conductive material. An example of a fluoride ion battery comprising the cathode active material layer containing just $PbF_2$ as the solid electrolyte is a fluoride ion battery after the first discharge. In this case, the peak of the cathode active material and the peak of $PbF_2$ which is the solid electrolyte are preferably present when an XRD measurement is conducted for the cathode active material layer after charge. The characteristic peaks of $PbF_2$ may include $2\theta = 26.0° \pm 0.5°$, $30.0° \pm 0.5°$, $43.0° \pm 0.5°$, and $50.9° \pm 0.5°$. Incidentally, the range of these peak positions may be $\pm 0.3°$, and may be $\pm 0.10$. Incidentally, the specification "containing just $PbF_2$ as the solid electrolyte" include the case where trace of solid electrolyte other than $PbF_2$ is added for the purpose of, for example, avoiding the infringement of the patent right. For example, when the proportion of the solid electrolyte other than $PbF_2$ in the cathode active material layer is 5 weight % or less also satisfy the condition "containing just $PbF_2$ as the solid electrolyte".

Also, $PbF_2$ included in the cathode active material layer is typically a solid electrolyte derived from the cathode active material. Whether $PbF_2$ is the solid electrolyte derived from the cathode active material can be determined by, for example, an observation by a transmission electron microscope (TEM). For example, when the active material (Cu+Bi) and the solid electrolyte ($PbF_2$) are dispersed in the atomic level in a TME measurement for the cathode active material layer after discharge, it can be determined as derived from the cathode active material (such as $Pb_2CuF_6$+$BiF_3$). Incidentally, the cathode active material includes Cu and Bi derived from the cathode active material (such as $Pb_2CuF_6$+$BiF_3$) before the first discharge. Depending on the level of discharge, the cathode active material layer may contain just Cu and Bi as the cathode active material, and may contain a cathode active material (such as $Pb_2CuF_6$+ $BiF_3$) before the first discharge in addition to Cu and Bi.

The cathode active material layer may and may not contain the solid electrolyte other than $PbF_2$, but the latter is preferable. The reason therefor is that excessive ion conducting path leads to lack of electron conducting path and thus the rate property is not easily improved. Also, the thickness of the cathode active material layer varies greatly with the constitutions of the batteries, and thus there is no particular limitation.

2. Anode Active Material Layer

The anode active material layer in the present disclosure is a layer containing at least an anode active material. Also, the anode active material layer may further contain at least one of a conductive material, a solid electrolyte, and a binder, other than the anode active material.

As the anode active material, an arbitrary active material having a lower potential than that of the cathode active material may be selected. Examples of the anode active material may include a simple substance of metal, an alloy, a metal oxide, and fluoride of these. The metal element to be included in the anode active material may be, for example, La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably Mg, $MgF_x$, Al, $AlF_x$, Ce, $CeF_x$, Ca, $CaF_x$, Pb, and $PbF_x$. Incidentally, the "x" is a real number larger than 0.

As the conductive material and the binder, the same materials as those described in "1. Cathode active material layer" above may be used. The solid electrolyte is in the same contents as those described in "3. Electrolyte layer" later; thus, the descriptions herein are omitted.

The content of the anode active material in the anode active material layer is preferably larger from the viewpoint of the capacity. For example, the content is 30 weight % or more, preferably 50 weight % or more, and more preferably 70 weight % or more. Also, the thickness of the anode active material layer varies greatly with the constitutions of the batteries, and thus there are no particular limitations.

3. Electrolyte Layer

The electrolyte layer in the present disclosure is a layer formed between the cathode active material layer and the anode active material layer. The electrolyte to be configured in the electrolyte layer may be an electrolyte solution (a liquid electrolyte), and may be a solid electrolyte. In other words, the electrolyte layer may be a liquid electrolyte layer, and may be a solid electrolyte layer; however, the latter is preferable.

The liquid electrolyte in the present disclosure contains a fluoride salt and an organic solvent for example. Examples of the fluoride salt may include an inorganic fluoride salt, an organic fluoride salt, and an ionic solution. An example of the inorganic fluoride salt may be XF (X is Li, Na, K, Rb, or Cs). An example of the cation of the organic fluoride salt may be an alkyl ammonium cation such as tetramethyl ammonium cation. The concentration of the fluoride salt in the liquid electrolyte is, for example, 0.1 mol % or more and 40 mol % or less, and preferably 1 mol % or more and 10 mol % or less.

The organic solvent of the liquid electrolyte is usually a solvent that dissolves the fluoride salt. Examples of the organic solvent may include glyme such as triethylene glycol dimethyl ether (G3) and tetraethylene glycol dimethyl ether (G4); a cyclic carbonate such as ethylene carbonate (EC), fluoroethylene carbonate (FEC), difluoroethylene carbonate (DFEC), propylene carbonate (PC), and butylene carbonate (BC); and a chain carbonate such as dimethyl carbonate (DMC), diethyl carbonate (DEC), and ethyl methyl carbonate (EMC). Also, an ionic solution may be used as the organic solvent.

On the other hand, examples of the solid electrolyte may include an inorganic solid electrolyte. Examples of the inorganic solid electrolyte may include a fluoride containing a lanthanoid element such as La and Ce, a fluoride containing an alkali element such as Li, Na, K, Rb, and Cs, and a fluoride containing an alkali earth element such as Ca, Sr, and Ba. Specific examples of the inorganic solid electrolyte may include a fluoride containing La and Ba, a fluoride containing Pb and Sn, and a fluoride containing Bi and Sn.

Also, the thickness of the electrolyte layer in the present disclosure varies greatly with the constitutions of the batteries, and thus there are no particular limitations.

4. Other Constitutions

The fluoride ion battery of the present disclosure comprises at least the above described anode active material layer, cathode active material layer, and electrolyte layer, and usually further comprises a cathode current collector for collecting currents of the cathode active material layer, and an anode current collector for collecting currents of the anode active material layer. Examples of the shape of the current collector may include a foil shape, a mesh shape, and a porous shape. Also, the fluoride ion battery of the present disclosure may include a separator between the cathode active material layer and the anode active material layer. The reason therefor is to obtain a battery with higher safety.

5. Fluoride Ion Battery

The fluoride ion battery of the present disclosure may be a primary battery and may be a secondary battery, but is preferably a secondary battery among them, so as to be repeatedly charged and discharged, and useful as a car-mounted battery for example. Incidentally, the secondary battery includes the usage of the secondary battery as a primary battery (for the purpose just to discharge once after charge). Also, examples of the shape of the fluoride ion battery of the present disclosure may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is described in further details.

Reference Example 1

Synthesis of Cathode Active Material $PbF_2$ and $CuF_2$ were weighed so as to be $PbF_2$:$CuF_2$=2:1 in the molar ratio, and mechanical milling thereto was conducted by a ball mill in the conditions of 600 rpm and for 3 hours to obtain a cathode active material ($Pb_2CuF_6$). The average particle size ($D_{50}$) of the obtained cathode active material was 1 μm.

XRD Measurement

Figure 3:
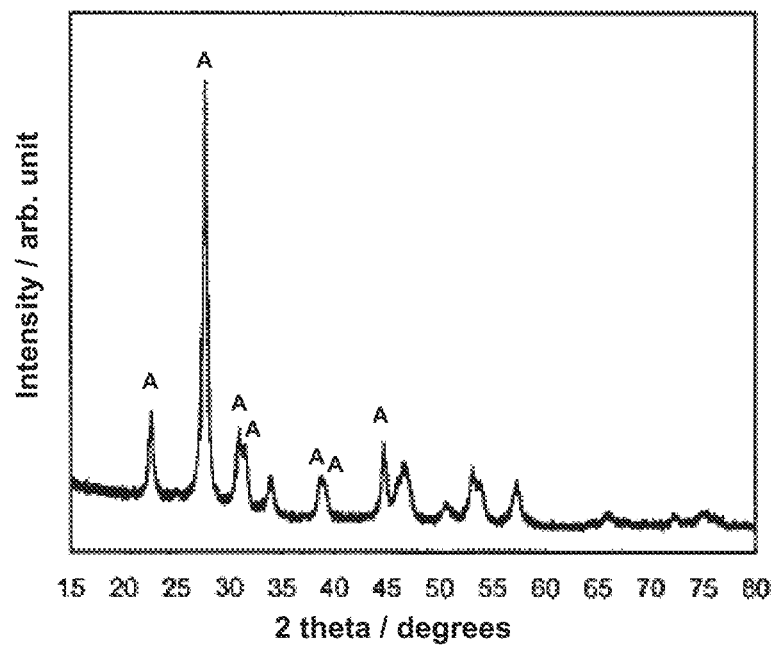
FIG. 3 is the result of an XRD measurement for the cathode active material ($Pb_2CuF_6$) fabricated in Reference Example 1.

An X-ray diffraction measurement (XRD measurement) was conducted to the obtained cathode active material ($Pb_2CuF_6$). Incidentally, a CuKα ray was used as the source of radiation. The result is shown in FIG. 3. As shown in FIG. 3, it was confirmed that the cathode active material ($Pb_2CuF_6$) was a material with a single phase. The peaks at $2\theta=22.6°$, $27.8°$, $30.8°$, $31.6°$, $38.5°$, $39.1°$, and $44.8°$ were confirmed as the characteristic peaks of $Pb_2CuF_6$. The crystal structure of $Pb_2CuF_6$ is categorized as space group C2/m. Incidentally, there is a possibility the notation of the space group may be changed slightly if the element position shifts a little.

Fabrication of Evaluation Battery

A cathode mixture was obtained by mixing the obtained cathode active material ($Pb_2CuF_6$) and acetylene black (AB) as a conductive material (electron conductor) in the weight ratio of $Pb_2CuF_6$:AB=95:5. The obtained cathode mixture (work electrode), solid electrolyte ($Pb_{0.6}Sn_{0.4}F_2$) for forming a solid electrolyte layer, and a Pb foil (counter electrode) were pressure-powder-molded to obtain an evaluation battery.

Charge and Discharge Test

Figure 4:
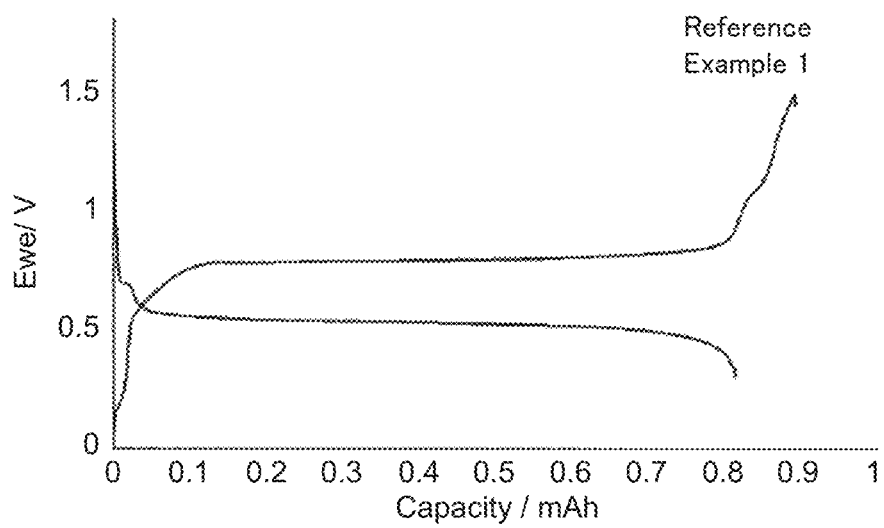
FIG. 4 is the result of a charge and discharge test for the evaluation battery obtained in Reference Example 1.

A charge and discharge test in a cell heated at 140° C. was conducted for the obtained evaluation battery. Current conditions were 20 μA/cm² (discharge) and 40 μA/cm² (charge). The result is shown in FIG. 4. As shown in FIG. 4, the obtained evaluation battery showed excellent charge and discharge capacities.

Figure 5:
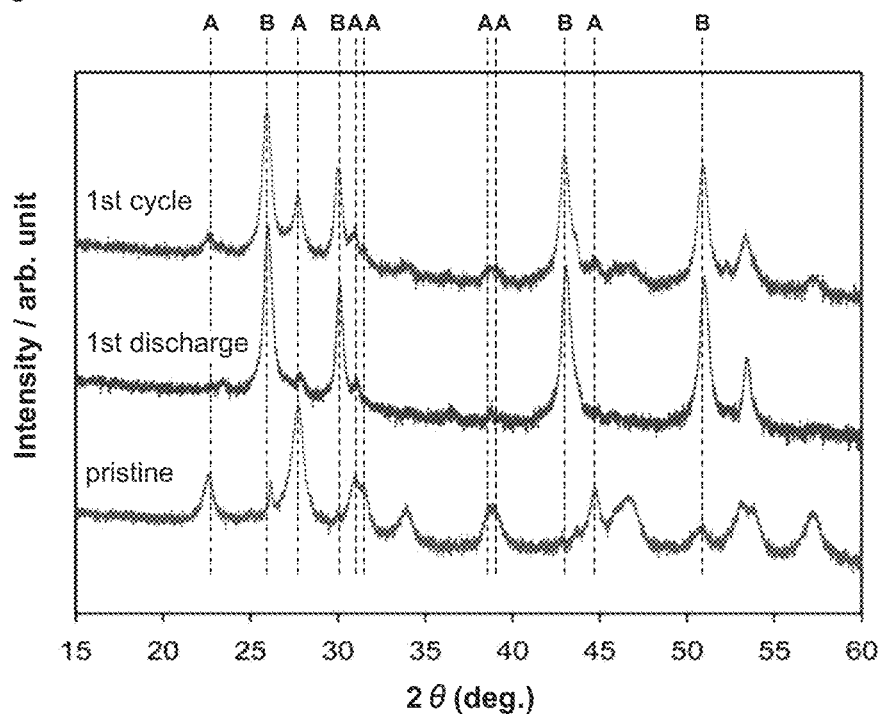
FIG. 5 is the result of an XRD measurement for the cathode active material after the first discharge and after the first charge in Reference Example 1.

Also, an XRD measurement was conducted in the same manner as above for the cathode active material ($Pb_2CuF_6$) after the first discharge and after the first charge. The result is shown in FIG. 5. As shown in FIG. 5, due to the first discharge, the peak of $Pb_2CuF_6$ (peak marked as A in FIG. 5) became small and the peak of $PbF_2$ (peak marked as B in FIG. 5) became large. Thus, it was confirmed that the phase-split of $Pb_2CuF_6$ was caused by the first discharge. Also, due to the first charge, the peak of $PbF_2$ (peak marked as B in FIG. 5) slightly became small and the peak of $Pb_2CuF_6$ (peak marked as A in FIG. 5) became slightly large. Thus, it was confirmed that $Pb_2CuF_6$ was generated again by the first charge. It means that, due to the first discharge and the first charge, the following reaction presumably reversibly proceeded:

$$Pb_2CuF_6+e^- \leftrightarrow 2PbF_2+Cu+2F^-.$$

Reference Examples 2 to 6

A cathode active material was obtained in the same manner as in Reference Example 1 except that the ratio of $PbF_2$ and $CuF_2$ was changed so as the below compositions were obtained. The compositions of the cathode active materials were $Pb_{1.5}Cu_{1.5}F_6$ (Reference Example 2), $PbCu_2F_6$ (Reference Example 3), $Pb_{0.5}Cu_{2.5}F_6$ (Reference Example 4), and $Pb_{0.25}Cu_{2.75}F_6$ (Reference Example 5). Also, as Reference Example 6, a cathode active material was obtained by conducting a mechanical milling for $CuF_2$ in the same conditions as in Reference Example 1. An evaluation battery was obtained in the same manner as in Reference Example 1 except that the obtained cathode active material was used therein.

XRD Measurement

Figure 6:
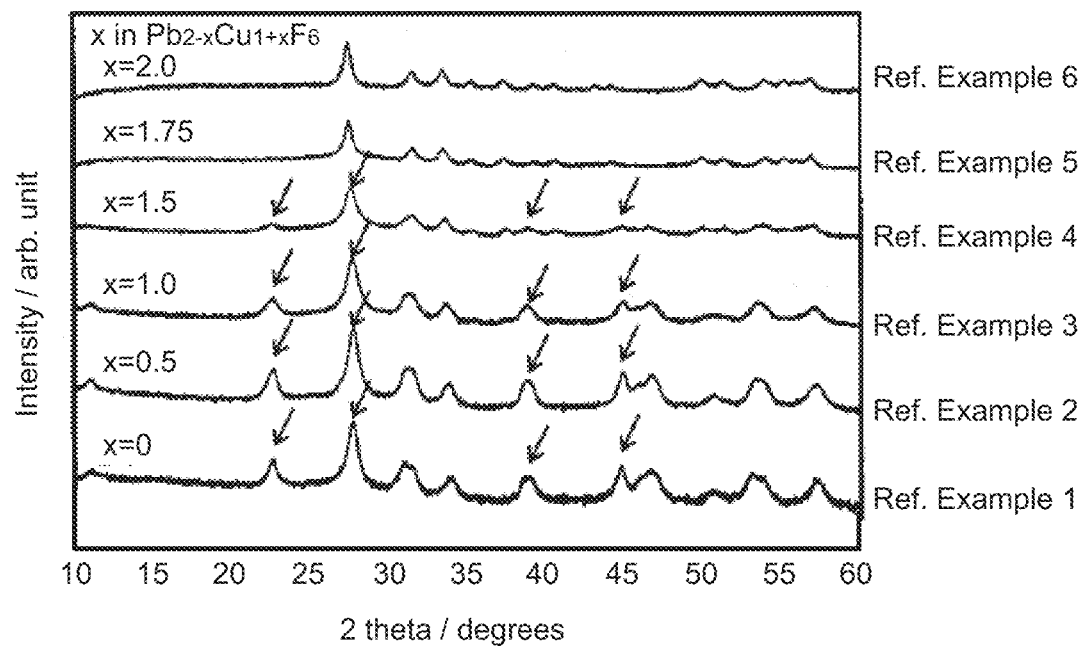
FIG. 6 is the result of an XRD measurement for the cathode active materials fabricated in Reference Examples 1 to 6.

An X-ray diffraction measurement (XRD measurement) was conducted for the cathode active materials fabricated in Reference Examples 1 to 6. Incidentally, a CuKα ray was used as the source of radiation. The result is shown in FIG. 6. As shown in FIG. 6, it was confirmed that all the cathode active materials fabricated in Examples 1 to 4 had the $Pb_2CuF_6$ crystal phase although the compositions were different. In specific, it was confirmed that the cathode active materials fabricated in Reference Examples 1 to 4 had the typical peaks of the $Pb_2CuF_6$ crystal phase ($2\theta=$ in the 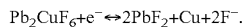 vicinity of 22.6°, in the vicinity of 27.8°, in the vicinity of 38.7°, and in the vicinity of 44.8°).

Since the dispositions of cations in the crystal structure of $Pb_2CuF_6$ and in the crystal structure of $CuF_2$ are alike, it is presumed that $Pb_2CuF_6$ and $CuF_2$ can form a solid solution. Thus, it is presumed that $CuF_2$ was dissolved in $Pb_2CuF_6$ in the cathode active materials fabricated in Reference Examples 2 to 4. Incidentally, in Reference Example 5, as described later, although the discharge capacity in the first cycle was high and it functions as a cathode active material, just the peak of the $CuF_2$ crystal phase was confirmed in the same manner as in Reference Example 6, but the peak of the $Pb_2CuF_6$ crystal phase was not confirmed.

Figure 7:
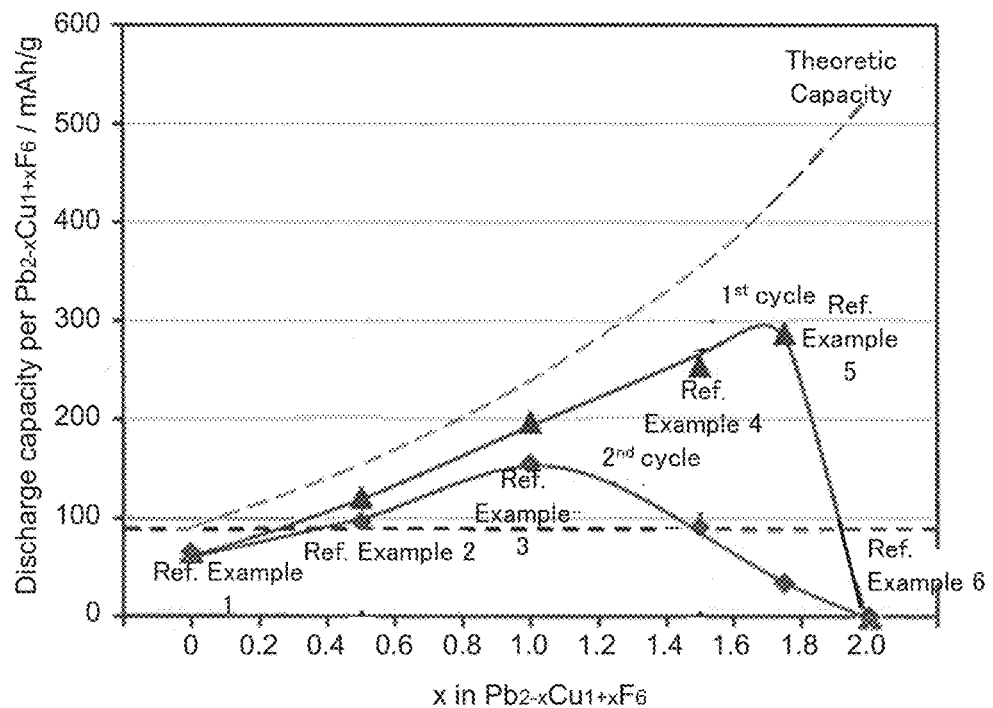
FIG. 7 is the result of a charge and discharge test for the evaluation batteries obtained in Reference Examples 1 to 6.

A charge and discharge test in a cell heated at 140° C. was conducted for the obtained evaluation batteries obtained in Reference Examples 1 to 6. The current conditions were the same as in Reference Example 1. The result is shown in FIG. 7. As shown in FIG. 7, in Reference Examples 1 to 5, unlike Reference Example 6, high discharge capacity was obtained in the first cycle. Also, when the value of "x" becomes large in $Pb_{2-x}Cu_1+F_6$, the theoretical capacity increases and high capacity may be achieved; however, in the same manner, high capacity was achieved regarding the discharged capacity in the first cycle in Reference Examples 1 to 5. Meanwhile, degrade in discharge capacity occurred in the second cycle in Reference Examples 1 to 5, but degrade in discharge capacity was comparatively small in Reference Examples 2 to 4 ($0.5 \leq x \leq 1.5$).

Example 1

$PbF_2$, $CuF_2$, and $BiF_3$ were weighed so as to be $PbF_2$:$CuF_2$:$BiF_3$=0.45:2.25:0.1 in the molar ratio, mechanical milling was conducted thereto by a ball mill in the conditions of 600 rpm and for 3 hours to obtain a cathode active material ($90Pb_{0.5}Cu_{2.5}F_6$-$10BiF_3$). An evaluation battery was obtained in the same manner as in Reference Example 1 except that the obtained cathode active material was used.

Example 2

$PbF_2$, $CuF_2$, and $BiF_3$ were weighed so as to be $PbF_2$:$CuF_2$:$BiF_3$=0.4:2:0.2 in the molar ratio, mechanical milling was conducted thereto by a ball mill in the conditions of 600 rpm and for 3 hours to obtain a cathode active material ($80Pb_{0.5}Cu_{2.5}F_6$-$20BiF_3$). An evaluation battery was obtained in the same manner as in Reference Example 1 except that the obtained cathode active material was used.

Example 3

$PbF_2$, $CuF_2$, and $BiF_3$ were weighed so as to be $PbF_2$:$CuF_2$:$BiF_3$=0.35:1.75:0.3 in the molar ratio, mechanical milling was conducted thereto by a ball mill in the conditions of 600 rpm and for 3 hours to obtain a cathode active material ($70Pb_{0.5}Cu_{2.5}F_6$-$30BiF_3$). An evaluation battery was obtained in the same manner as in Reference Example 1 except that the obtained cathode active material was used.

Example 4

$PbF_2$, $CuF_2$, and $BiF_3$ were weighed so as to be $PbF_2$:$CuF_2$:$BiF_3$=0.3:1.5:0.4 in the molar ratio, mechanical milling was conducted thereto by a ball mill in the conditions of 600 rpm and for 3 hours to obtain a cathode active material ($60Pb_{0.5}Cu_{2.5}F_6$-$40BiF_3$). An evaluation battery was obtained in the same manner as in Reference Example 1 except that the obtained cathode active material was used.

XRD Measurement

Figure 8:
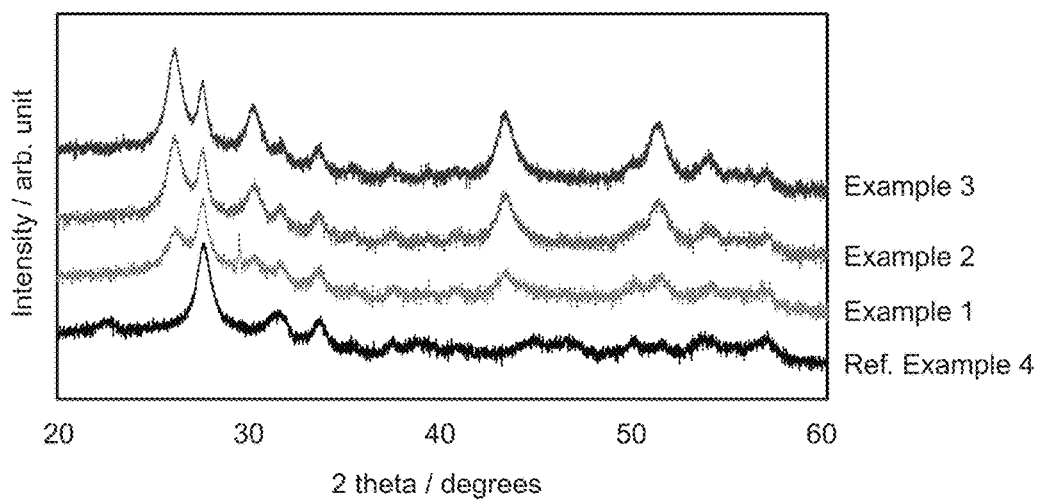
FIG. 8 is the result of an XRD measurement for the cathode active materials fabricated in Examples 1 to 3 and Reference Example 4.

An X-ray diffraction measurement (XRD measurement) was conducted for the cathode active materials fabricated in Examples 1 to 3 and Reference Example 4. Incidentally, a CuKα ray was used as the source of radiation. The result is shown in FIG. 8. As shown in FIG. 8, it was confirmed that all the cathode active materials fabricated in Examples 1 to 3 had the $Pb_2CuF_6$ crystal phase in the same manner as in the cathode active material fabricated in Reference Example 4. Also, in the cathode active materials fabricated in Examples 1 to 3, the characteristic peaks of the $BiF_3$ crystal phase (2θ= in the vicinity of 26.1°, in the vicinity of 30.2°, in the vicinity of 43.3°, and in the vicinity of 51.2°) were confirmed.

Charge and Discharge Test

Figure 9:
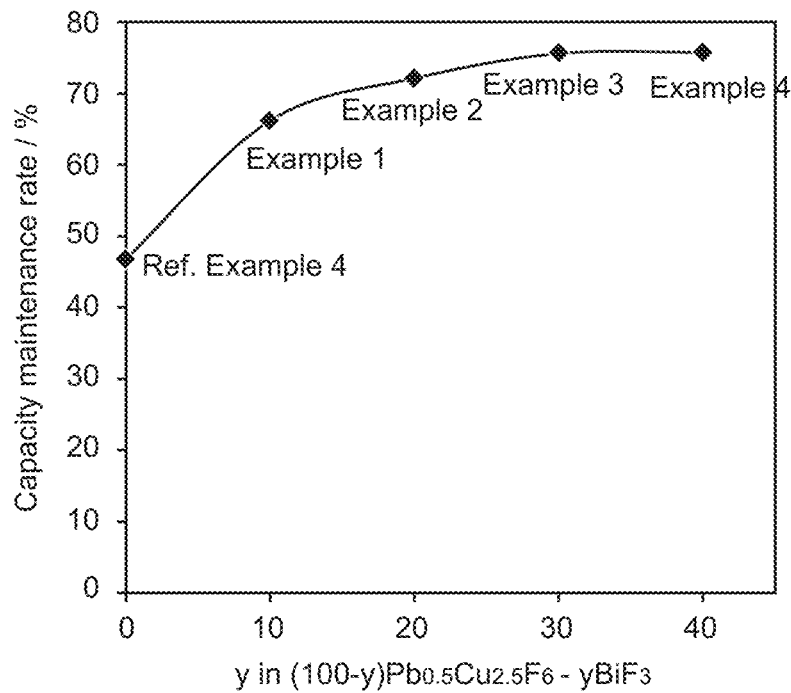
FIG. 9 is the result of a charge and discharge test for the evaluation batteries obtained in Examples 1 to 4 and Reference Example 4.
Figure 10:
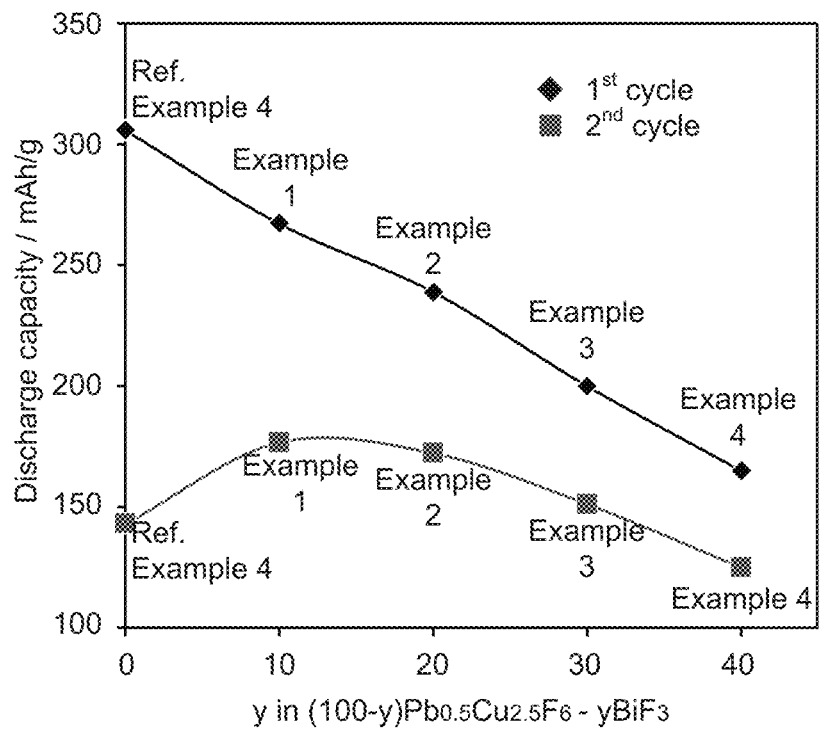
FIG. 10 is the result of a charge and discharge test for the evaluation batteries obtained in Examples 1 to 4 and Reference Example 4.

A charge and discharge test in a cell heated at 140° C. was conducted for the obtained evaluation batteries obtained in Examples 1 to 4 and Reference Example 4. The current conditions were the same as in Reference Example 1. The discharge capacity in the second cycle to the discharge capacity in the first cycle was obtained as a capacity maintenance rate (%). The result is shown in FIG. 9. As shown in FIG. 9, it was confirmed that the capacity maintenance rate in Examples 1 to 4 was higher than that of Reference Example 4. The reason therefor is that Bi not dissolvable in Cu coexisted so as to inhibit the aggregation of fine particles of Cu generated during discharge to be coarsen. As the result, in the charge thereafter, the reaction presumably proceeded to the inside of Cu. Also, as shown in FIG. 10, in Examples 1 to 3, excellent effect was obtained such that the discharge capacity in the second cycle was increased more than that of Reference Example 4.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . fluoride ion battery

What is claimed is:

1. A fluoride ion battery comprising a cathode active material layer, an anode active material layer, and an electrolyte layer formed between the cathode active material layer and the anode active material layer, wherein
the cathode active material layer contains a cathode active material comprising:
a first active material having a composition represented by $Pb_{2-x}Cu_{1+x}F_6$, wherein $0.5 \leq x \leq 1.5$; and
a second active material containing a Bi element and a F element.

2. The fluoride ion battery according to claim 1, wherein the first active material and the second active material are dissolved.

3. The fluoride ion battery according to claim 1, wherein a proportion of the second active material to a total of the first active material and the second active material is 30 mol % or less.

4. The fluoride ion battery according to claim 1, wherein the cathode active material layer is a layer not containing a solid electrolyte.

5. The fluoride ion battery according to claim 1, wherein the first active material has a peak at a position of 2θ=22.6°±0.5°, 27.8°±0.5°, 38.5°±0.5°, 44.8°±0.5°, in X-ray diffraction measurement using a CuKα ray.

6. The fluoride ion battery according to claim 1, wherein $1.0 \leq x \leq 1.5$.

* * * * *